(12) United States Patent
Uchimura et al.

(10) Patent No.: US 11,441,668 B2
(45) Date of Patent: Sep. 13, 2022

(54) MOTOR DEVICE AND METHOD FOR MANUFACTURING SAME

(71) Applicant: MITSUBA Corporation, Gunma (JP)

(72) Inventors: Hiroyuki Uchimura, Gunma (JP); Kyohei Ishikawa, Gunma (JP); Yuta Nishino, Gunma (JP); Hiroki Aikyo, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/266,099

(22) PCT Filed: Oct. 8, 2019

(86) PCT No.: PCT/JP2019/039560
§ 371 (c)(1),
(2) Date: Feb. 4, 2021

(87) PCT Pub. No.: WO2020/105300
PCT Pub. Date: May 28, 2020

(65) Prior Publication Data
US 2022/0112937 A1    Apr. 14, 2022

(30) Foreign Application Priority Data

Nov. 21, 2018 (JP) .............................. JP2018-217862

(51) Int. Cl.
*F16H 57/02* (2012.01)
*H02K 7/10* (2006.01)
(Continued)

(52) U.S. Cl.
CPC ........... *F16H 57/039* (2013.01); *B29D 15/00* (2013.01); *F16H 1/16* (2013.01); *H02K 7/1166* (2013.01);
(Continued)

(58) Field of Classification Search
CPC ........ F16H 1/16; F16H 57/021; F16H 57/039; F16H 2057/0213; F16C 3/02;
(Continued)

(56) References Cited

U.S. PATENT DOCUMENTS

| 6,218,922 B1 | 4/2001 | Clark et al. |
| 6,591,707 B2 * | 7/2003 | Torii ..................... F16H 57/031 74/425 |

(Continued)

FOREIGN PATENT DOCUMENTS

| CN | 104653712 A * | 5/2015 | ............... F16H 1/16 |
| CN | 105715772 A * | 6/2016 | ............ E05F 15/697 |

(Continued)

OTHER PUBLICATIONS

"International Search Report (Form PCT/ISA/210) of PCT/JP2019/039560," dated Dec. 10, 2019, with English translation thereof, pp. 1-4.

(Continued)

*Primary Examiner* — Adam D Rogers
(74) *Attorney, Agent, or Firm* — JCIPRNET

(57) ABSTRACT

Provided are a motor device and a method for manufacturing the same that can accurately and consistently provide a support shaft to a case and enhance the strength for fixing the support shaft to the case. A small-diameter part having a smaller diameter than a large-diameter part is formed through drawing. The large-diameter part and a step part are embedded in a gear case. The small-diameter part is exposed outside the gear case. The dimensional accuracy (dimensional tolerance $\pm\alpha$) of the external diameter of the small-diameter part is enhanced. The small-diameter part can be set, without rattling, in a lower mold for molding the gear case. Consequently, the support shaft can be accurately and consistently provided to the gear case. Because the large- (Continued)

41: Gear case (case)
50: Support shaft
51: Large-diameter part
52: Small-diameter part
53: Step part diameter part and the step part are embedded in the gear case, the resistance of the support shaft against pulling from the gear case can be enhanced.

8 Claims, 7 Drawing Sheets

(51) Int. Cl.
*F16H 1/04* (2006.01)
*B29D 15/00* (2006.01)
*B21K 1/06* (2006.01)
*F16H 57/039* (2012.01)
*F16H 1/16* (2006.01)
*H02K 7/116* (2006.01)
*B21K 1/10* (2006.01)
*F16C 3/02* (2006.01)
*F16H 57/021* (2012.01)

(52) U.S. Cl.
CPC ............... *B21K 1/10* (2013.01); *F16C 3/02* (2013.01); *F16C 2220/48* (2013.01); *F16H 2057/0213* (2013.01)

(58) Field of Classification Search
CPC ............. F16C 2220/48; F16C 2380/27; H02K 7/1166; B21D 15/00; B21K 1/10
See application file for complete search history.

(56) References Cited

U.S. PATENT DOCUMENTS

| | | | | |
|---|---|---|---|---|
| 8,294,310 | B2* | 10/2012 | Shimoyama | F16H 1/225 |
| | | | | 310/83 |
| 9,651,135 | B2* | 5/2017 | Weigold | F16H 57/0031 |
| 2005/0140224 | A1* | 6/2005 | Weigold | B60S 1/166 |
| | | | | 310/90 |
| 2011/0036678 | A1* | 2/2011 | Hashizume | F16D 27/06 |
| | | | | 192/84.91 |

FOREIGN PATENT DOCUMENTS

| | | | | |
|---|---|---|---|---|
| CN | 108167391 A | * | 6/2018 | |
| CN | 110206852 A | * | 9/2019 | .............. F16H 1/16 |
| DE | 102011077102 A1 | * | 12/2012 | .............. H02K 5/10 |
| EP | 0642954 A1 | * | 3/1995 | |
| JP | 2002106649 | | 4/2002 | |
| JP | 2008298238 | | 12/2008 | |
| JP | 2012120261 | | 6/2012 | |
| JP | 2016021791 A | * | 2/2016 | |

OTHER PUBLICATIONS

"Written Opinion of the International Searching Authority (Form PCT/ISA/237) of PCT/JP2019/039560," dated Dec. 10, 2019, with English translation thereof, pp. 1-7.

* cited by examiner

MOTOR DEVICE AND METHOD FOR MANUFACTURING SAME

CROSS-REFERENCE TO RELATED APPLICATION

This application is a 371 application of the International PCT application serial no. PCT/JP2019/039560, filed on Oct. 8, 2019, which claims the priority benefits of Japan Patent Application No. 2018-217862, filed on Nov. 21, 2018. The entirety of each of the above-mentioned patent applications is hereby incorporated by reference herein and made a part of this specification.

BACKGROUND

Technical Field

The invention relates to a motor device for decelerating and outputting the rotation of an armature shaft, and a method for manufacturing the same.

Description of Related Art

Conventionally, in drive sources such as power window devices and sunroof devices mounted on vehicles such as automobiles, a motor device with a deceleration mechanism which is small but can obtain a large output is used. Such a motor device is driven by operating an operation switch or the like in the passenger compartment, whereby the window glass, the sunroof or the like is opened and closed.

For example, the technique described in Patent Document 1 is known as a motor device with a deceleration mechanism used for drive sources such as power window devices and sunroof devices. The geared motor (motor device) described in Patent Document 1 includes a motor part and a gear part. The gear part includes a gear housing made of resin (case), a boss part is provided at the bottom of the gear housing, and a center shaft made of steel (support shaft) is fixed to the boss part. The center shaft rotatably supports a worm wheel that is rotationally driven with high torque.

RELATED ART

Patent Document

[Patent Document 1] Japanese Laid-Open No. 2002-106649

SUMMARY

Problems to be Solved

In order to fix the steel support shaft to the resin case, a so-called insert molding method is adopted, which is to set the support shaft in a mold and supply molten resin into the mold to mold the case. In this case, if the dimensional accuracy of the external diameter of the support shaft is low, the support shaft cannot be set accurately with respect to the mold, and as a result, the support shaft may rattle or incline in the mold.

Then, there may be a problem that the dimensions of the spacing between the fixing leg provided on the case, that is, the portion through which the bolt for fixing the motor device to the object to be fixed is inserted, and the support shaft may vary from product to product. If the dimensions of the spacing between the fixing leg and the support shaft vary in this way, the operation of the object to be driven (a window regulator in the case of a power window device) also varies.

The invention is to provide a motor device and a method for manufacturing the same, which can provide the support shaft to the case accurately without variation and make it possible to improve the strength with which the support shaft is fixed to the case.

Means for Solving the Problems

A motor device according to the invention is a motor device for decelerating and outputting rotation of an armature shaft. The motor device includes: a worm rotated by the armature shaft; a worm wheel having teeth meshed with the worm; a case made of resin and accommodating the worm and the worm wheel; a support shaft made of steel and rotatably supporting the worm wheel; a large-diameter part provided on an axial base end side of the support shaft; a small-diameter part provided on an axial tip end side of the support shaft and having a smaller diameter than the large-diameter part by drawing; and a step part provided between the large-diameter part and the small-diameter part of the support shaft. The large-diameter part and the step part are embedded in the case, and the small-diameter part is exposed outside the case.

In another embodiment of the invention, a collar part, which protrudes to a radial outer side of the support shaft, extends in a circumferential direction of the support shaft, and is embedded in the case, is provided on the axial base end side with respect to the large-diameter part of the support shaft.

In another embodiment of the invention, a groove, which is recessed to a radial inner side of the support shaft, extends in an axial direction of the support shaft, and is embedded in the case, is provided on the axial base end side with respect to the large-diameter part of the support shaft.

In another embodiment of the invention, an axial dimension of the large-diameter part is shorter than an axial dimension of the small-diameter part.

A manufacturing method of a motor device according to the invention is a manufacturing method of a motor device for decelerating and outputting rotation of an armature shaft. The motor device includes: a worm rotated by the armature shaft; a worm wheel having teeth meshed with the worm; a case made of resin and accommodating the worm and the worm wheel; a support shaft made of steel and rotatably supporting the worm wheel; a large-diameter part provided on an axial base end side of the support shaft; a small-diameter part provided on an axial tip end side of the support shaft and having a smaller diameter than the large-diameter part by drawing; and a step part provided between the large-diameter part and the small-diameter part of the support shaft. The large-diameter part and the step part are embedded in the case, and the small-diameter part is exposed outside the case. The small-diameter part is formed through a drawing process which presses a round bar made of steel and set in a die from an axial direction to push an axial tip end side of the round bar into a small-diameter part molding recess provided in the die and make an external diameter of the small-diameter part smaller than an external diameter of the large-diameter part.

Effects

According to the invention, the small-diameter part having a smaller diameter than the large-diameter part is provided by drawing, the large-diameter part and the step part are embedded in the case, and the small-diameter part is exposed outside the case. As a result, the dimensional accuracy of the external diameter of the small-diameter part is improved, and the small-diameter part can be set in the mold for molding the case without rattling, and consequently, it is possible to provide the support shaft to the case accurately without variation.

Further, since the large-diameter part and the step part are embedded in the case, the resistance of the support shaft against being pulled out from the case can be improved.

Therefore, it is possible to suppress the performance of the motor device from varying from product to product and to stably drive the object to be driven. Therefore, the yield can be improved.

Figure 4:
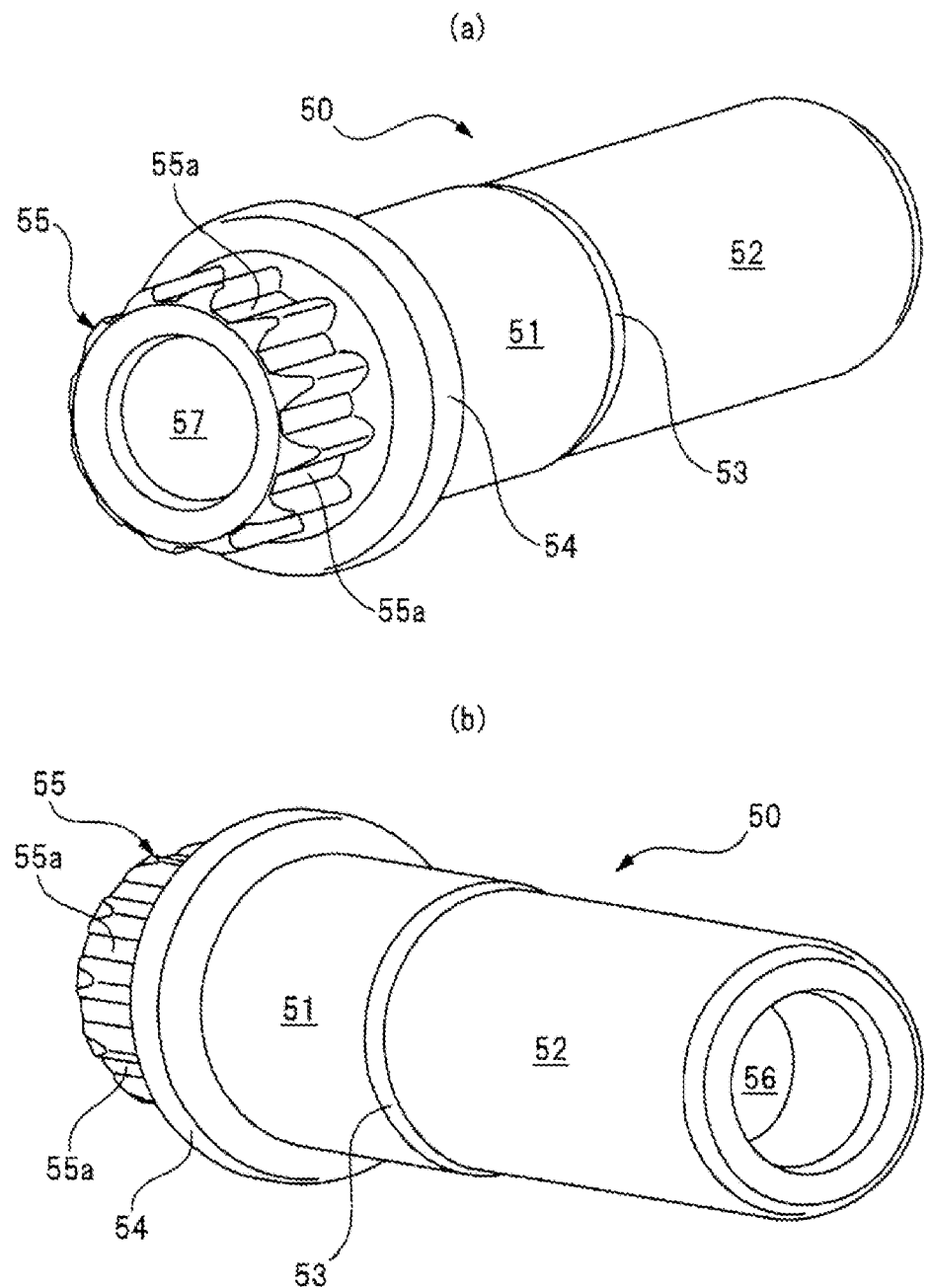

(a) and (b) of FIG. 4 are perspective views showing the support shaft as a single unit.

Figure 5:
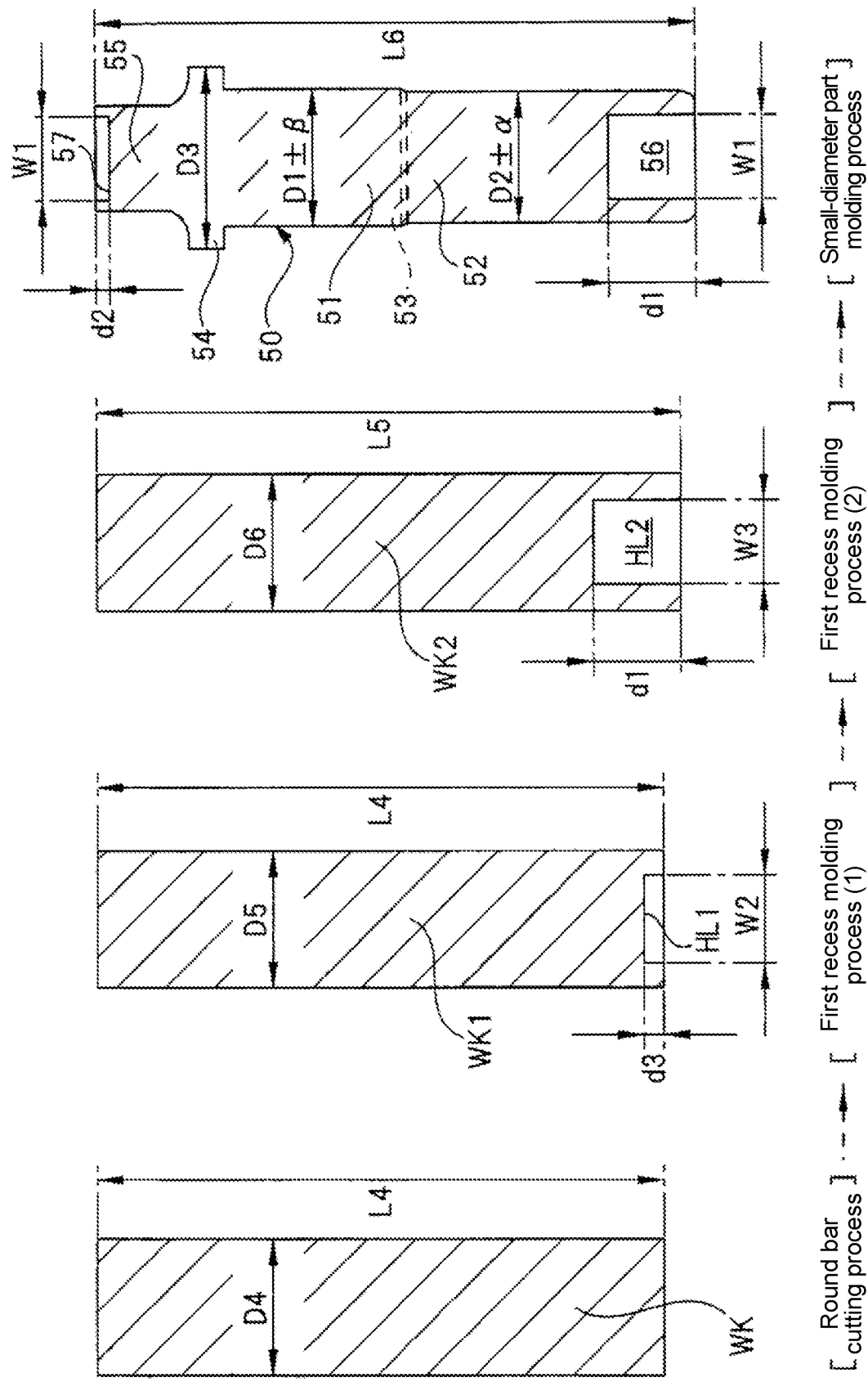

FIG. 5 is a cross-sectional view illustrating the manufacturing procedure of the support shaft.

Figure 6:
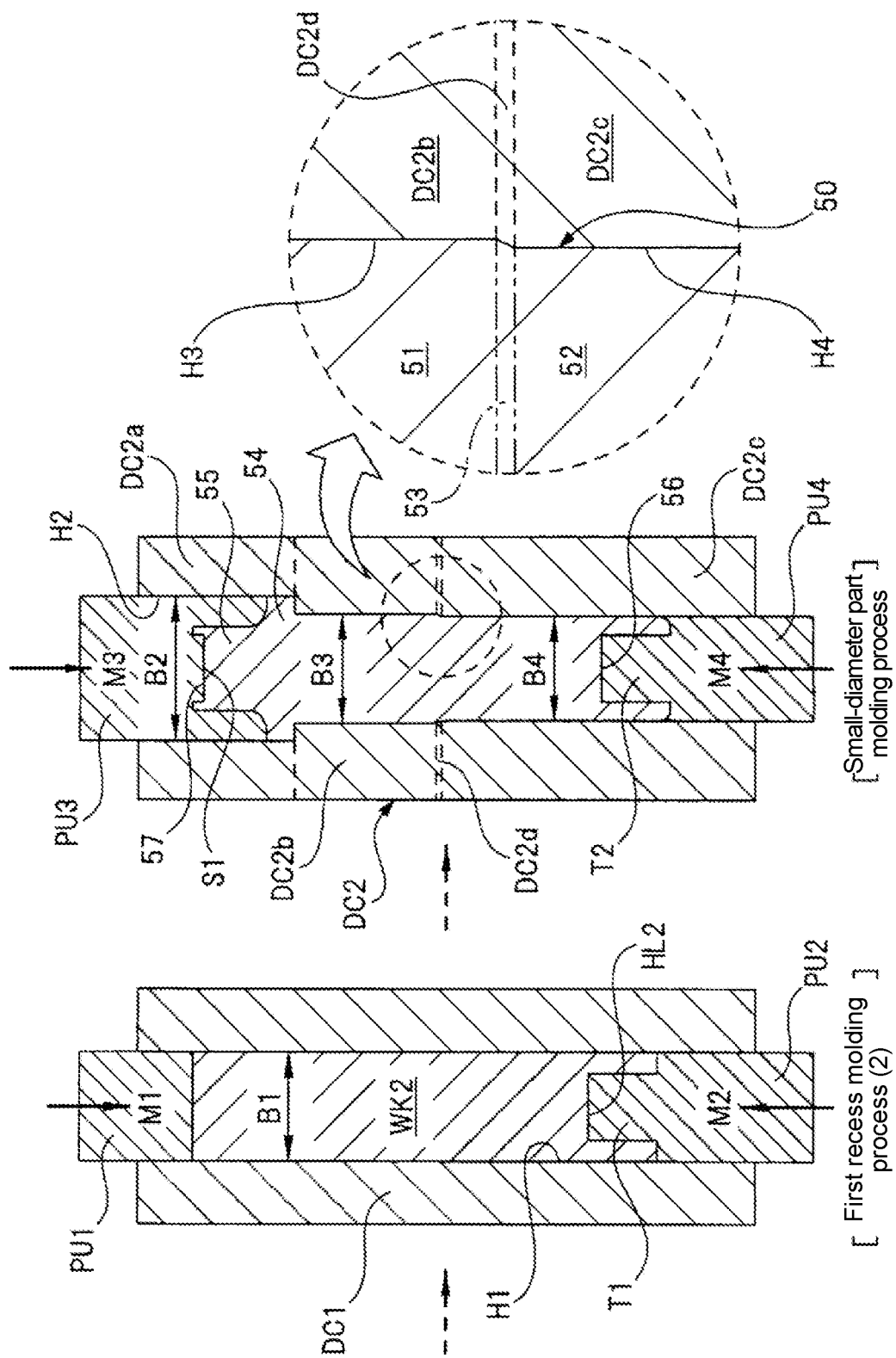

FIG. 6 is a cross-sectional view illustrating the operation of the manufacturing device for manufacturing the support shaft.

Figure 7:
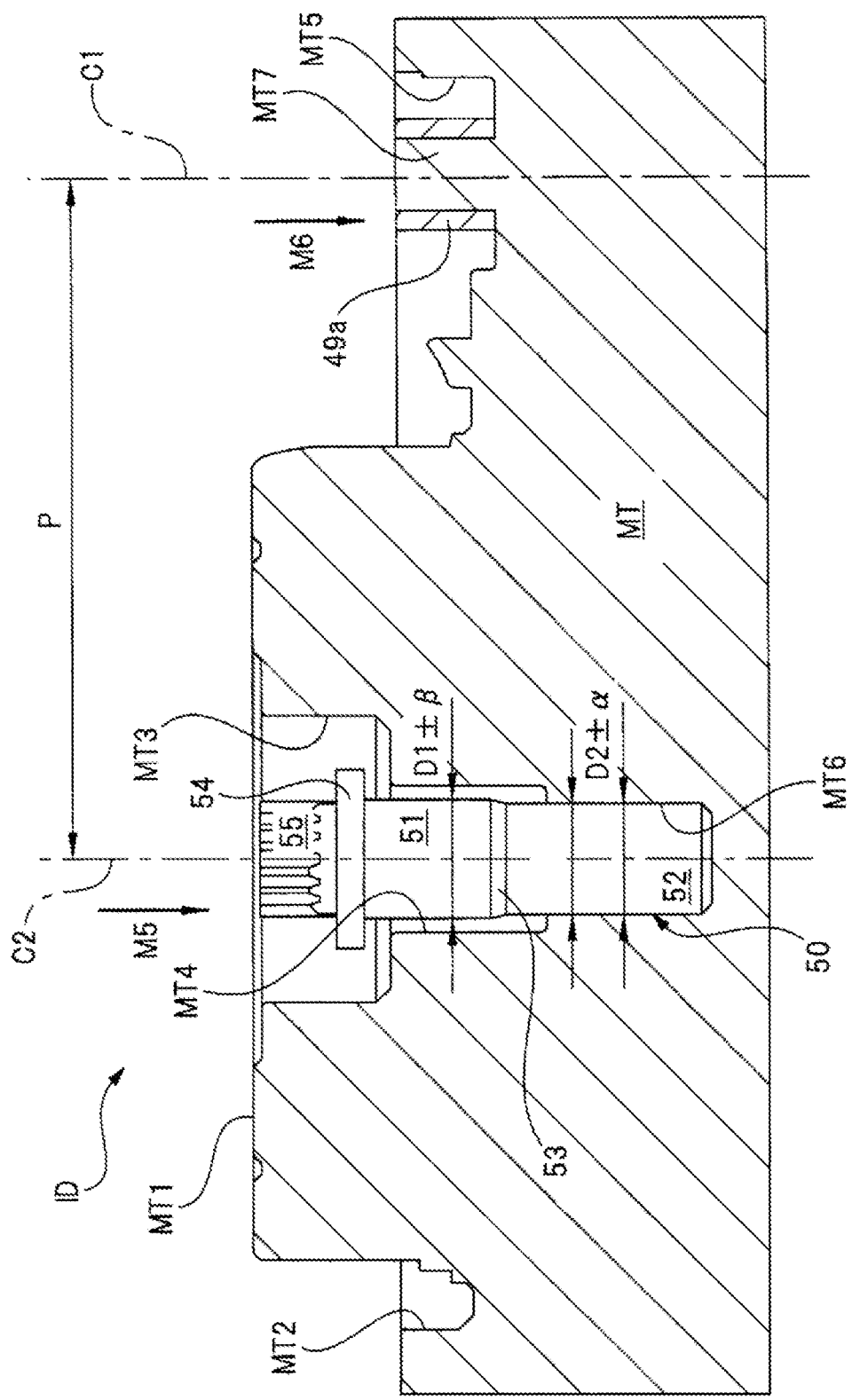

FIG. 7 is a cross-sectional view illustrating the lower mold for molding the gear case.

DESCRIPTION OF THE EMBODIMENTS

Hereinafter, an embodiment of the invention will be described in detail with reference to the figures.

Figure 1:
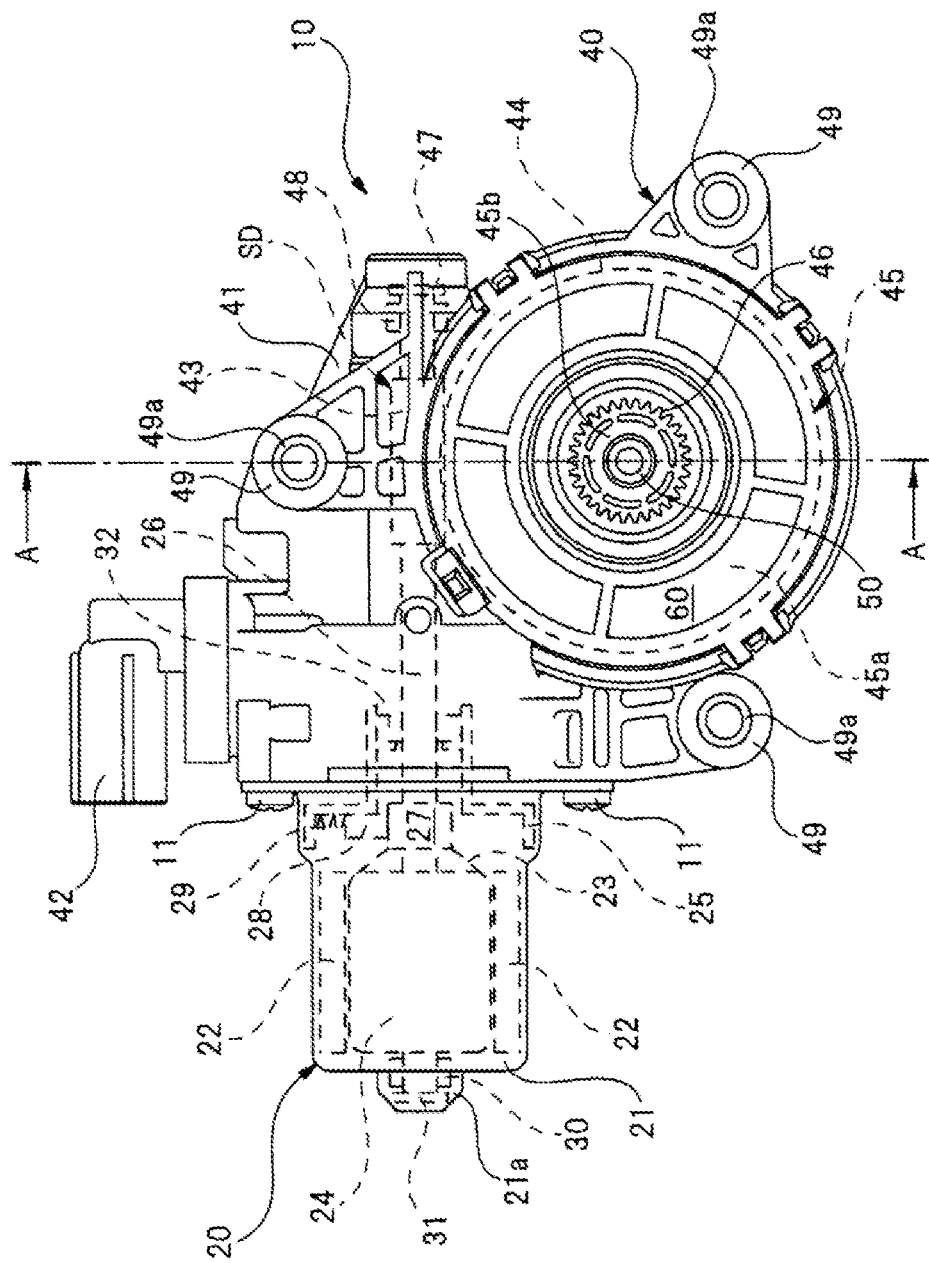
FIG. 1 is a plan view showing the motor device according to the invention.
Figure 2:
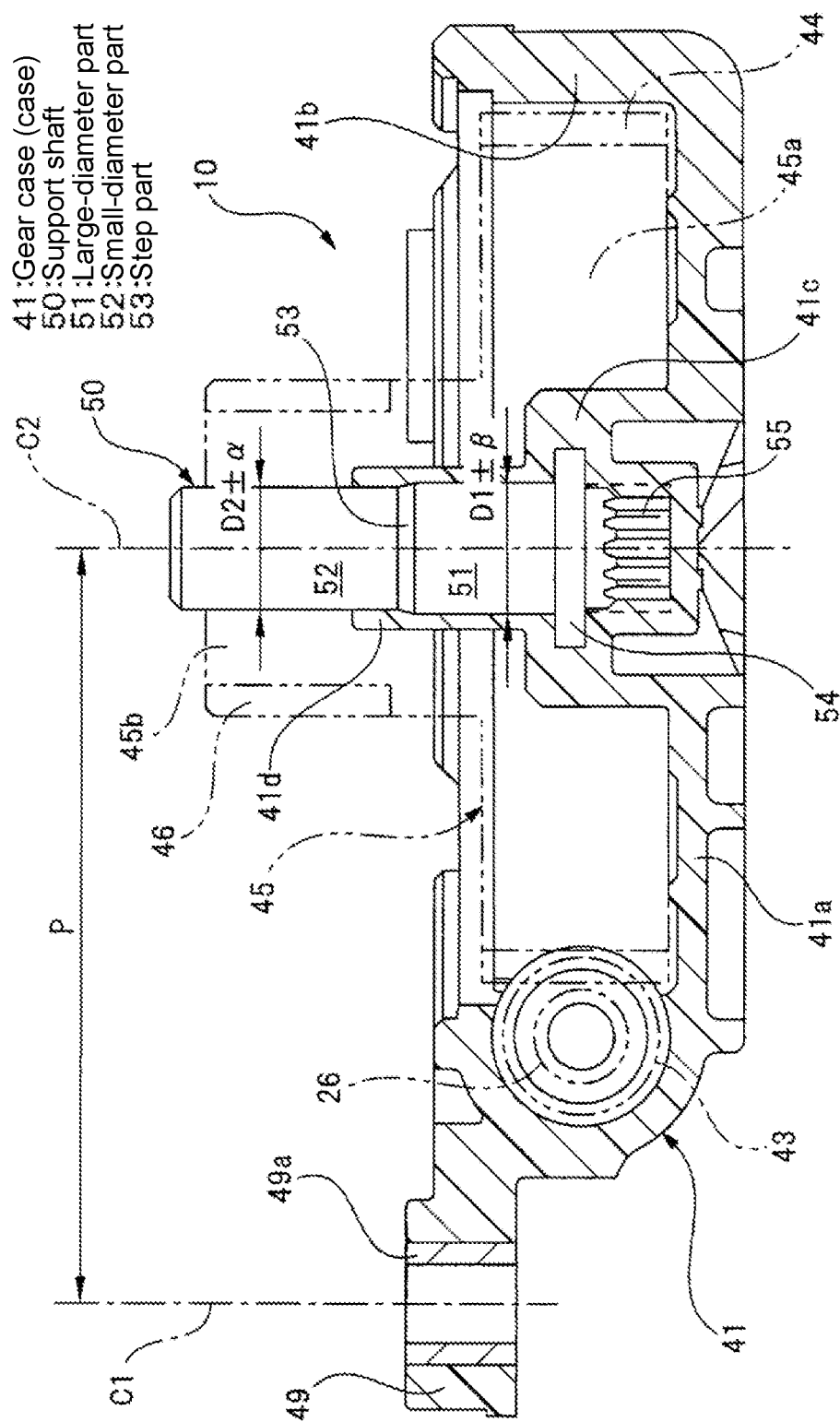
FIG. 2 is a cross-sectional view of the gear case taken along the line A-A of FIG. 1.
Figure 3:
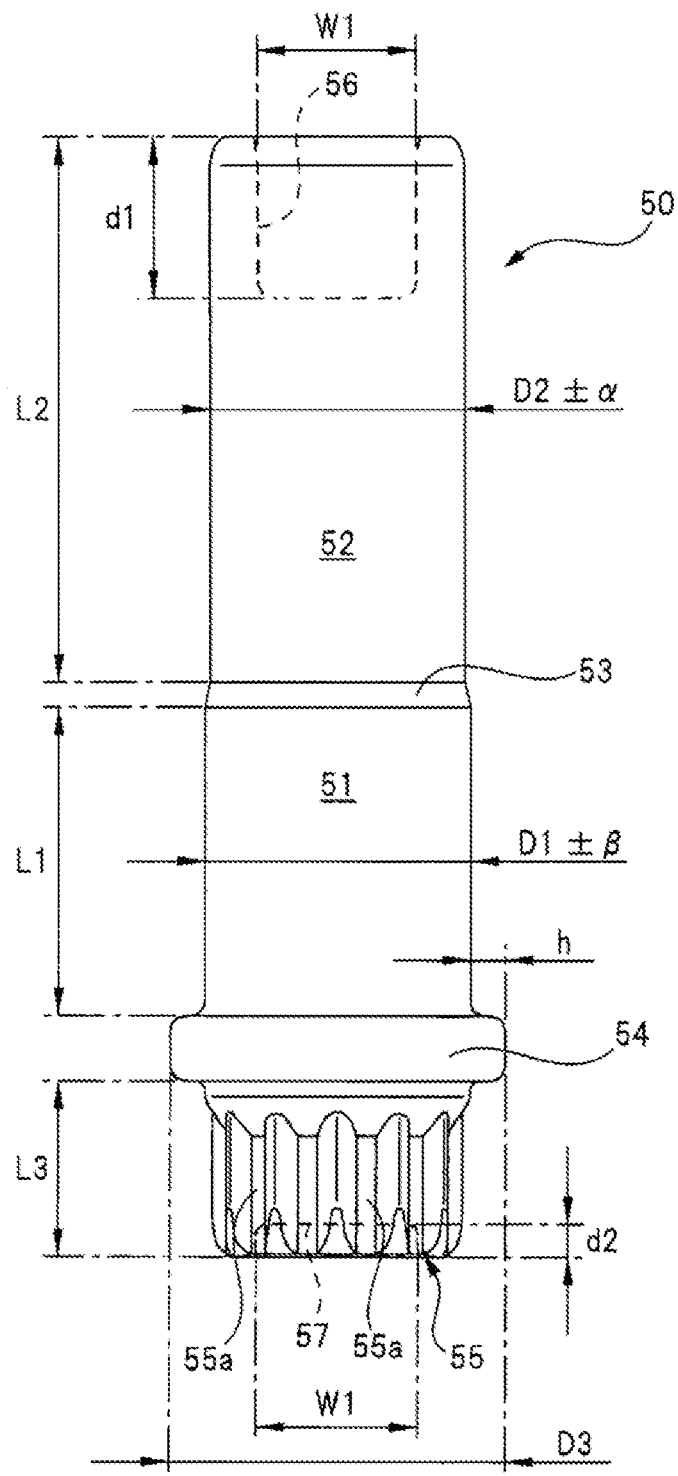
FIG. 3 is a plan view showing the support shaft as a single unit.

FIG. 1 is a plan view showing a motor device according to the invention, FIG. 2 is a cross-sectional view of a gear case taken along the line A-A of FIG. 1, FIG. 3 is a plan view showing a support shaft as a single unit, (a) and (b) of FIG. 4 are perspective views showing the support shaft as a single unit, FIG. 5 is a cross-sectional view illustrating a manufacturing procedure of the support shaft, FIG. 6 is a cross-sectional view illustrating an operation of a manufacturing device for manufacturing the support shaft, and FIG. 7 is a cross-sectional view illustrating a lower mold for molding the gear case, respectively.

A motor (motor device) 10 with a deceleration mechanism shown in FIG. 1 is used for a drive source of a power window device mounted on a vehicle such as an automobile to drive a window regulator (not shown) that raises or lowers the window glass. Since the motor 10 with the deceleration mechanism is installed in a narrow space inside a door of the vehicle, it has a flat shape as shown in FIG. 2. The motor 10 with the deceleration mechanism includes a motor part 20 and a gear part 40, and the motor part 20 and the gear part 40 are integrated (unitized) with each other by a plurality of fastening screws 11 (only two are shown in the figure).

As shown in FIG. 1, the motor part 20 includes a motor case 21. The motor case 21 is formed in a bottomed cylindrical shape by deep drawing a steel plate made of a magnetic material. Inside the motor case 21, a plurality of magnets 22 (only two are shown in the figure) having a substantially arc-shaped cross section are provided.

In addition, on the inner side of these magnets 22, an armature 24 around which a coil 23 is wound is rotatably provided through a predetermined gap. Then, a brush holder 25 is mounted on the opening side (right side in the figure) of the motor case 21, and the brush holder 25 closes the opening portion of the motor case 21.

An armature shaft 26 is fixed to the rotation center of the armature 24. A commutator 27 is provided at a portion of the armature shaft 26 close to the armature 24, and an end of the coil 23 wound around the armature 24 is electrically connected to the commutator 27.

A pair of brushes 28 (only one is shown in the figure) held by the brush holder 25 is in sliding contact with the outer peripheral portion of the commutator 27. These brushes 28 are arranged at an interval of 90 degrees around the commutator 27, and are respectively elastically in contact with the commutator 27 under a predetermined pressure due to a spring member 29. As a result, a drive current is supplied to the pair of brushes 28 from a vehicle-mounted controller (not shown), and an electromagnetic force (rotational force) is generated in the armature 24. Thus, the armature shaft 26 is rotated at a predetermined rotation speed in a predetermined rotation direction.

The bottom side (left side in the figure) of the motor case 21 is formed in a stepped shape, and the portion having the stepped shape is provided with a bottomed step part 21a that has a smaller diameter than the main body portion of the motor case 21. A first radial bearing 30 is mounted on the bottomed step part 21a, and the first radial bearing 30 rotatably supports one axial side (left side in the figure) of the armature shaft 26. Further, a first thrust bearing 31 is provided on the bottom side of the bottomed step part 21a, and the first thrust bearing 31 restricts the movement of the armature shaft 26 in the axial direction.

In addition, a second radial bearing 32 is mounted on the brush holder 25. The second radial bearing 32 rotatably supports the substantially central portion of the armature shaft 26 along the axial direction.

The gear part 40 includes a gear case (case) 41 and a connector member 42 attached to the gear case 41. The gear case 41 is formed into a predetermined shape by injection molding a resin material such as plastic, and is fixed to the opening portion of the motor case 21 by a plurality of fastening screws 11. The connector member 42 is inserted into a side of the gear case 41, and is fixed to the gear case 41 by a plurality of fixing screws (not shown) under this state.

The other axial side (right side in the figure) of the armature shaft 26 is rotatably accommodated inside the gear case 41, and a worm 43 is integrally provided on the other axial side and the outer peripheral portion of the armature shaft 26. That is, the worm 43 rotates with the rotation of the armature shaft 26.

In addition, a worm wheel 45 (serration worm wheel gear), which has teeth 44 meshed with the worm 43 on the outer peripheral portion, is rotatably accommodated inside the gear case 41. In other words, the worm 43 and the worm wheel 45 are rotatably accommodated inside the gear case 41, respectively. Here, the worm 43 is formed in a spiral shape, and the teeth 44 are inclined at a gentle inclination angle in the axial direction of the worm wheel 45. As a result, the rotational force of the worm 43 is smoothly transmitted to the worm wheel 45.

The worm wheel 45 includes a large-diameter main body part 45a provided with the teeth 44 on the outer peripheral portion, and a small-diameter output part 45b provided with a serration part 46 on the outer peripheral portion. The large-diameter main body part 45a is accommodated inside the gear case 41, and the small-diameter output part 45b is arranged outside the gear case 41.

Then, the worm 43 and the worm wheel 45 form a deceleration mechanism SD that decelerates the rotation of the armature shaft 26 and outputs it to the outside from the small-diameter output part 45b. Specifically, the rotational force increased in torque by the deceleration mechanism SD is output (transmitted) to a drum (not shown) of the window regulator that is connected to the serration part 46 to be able to transmit power.

On the other axial side of the armature shaft 26, a second thrust bearing 47 that restricts the movement of the armature shaft 26 in the axial direction is provided inside the gear case 41. Further, the other axial side of the armature shaft 26 is rotatably supported by a third radial bearing 48.

In this way, the first radial bearing 30 and the first thrust bearing 31 are provided on one axial side of the armature shaft 26, the second radial bearing 32 is provided at the axial central portion of the armature shaft 26, and the third radial bearing 48 and the second thrust bearing 47 are provided on the other axial side of the armature shaft 26. As a result, even if an axial force that tends to move in the axial direction acts on the armature shaft 26, the armature shaft 26 (armature 24) can rotate smoothly and efficiently.

Here, an external connector (not shown) on the vehicle side is connected to the connector member 42 fixed to the side of the gear case 41. Thus, by operating an operation switch (not shown) in the passenger compartment, the motor 10 with the deceleration mechanism is driven in the forward direction or the reverse direction. As a result, the window glass is raised or lowered.

As shown in FIG. 2, the gear case 41 includes a bottom wall 41a and a side wall 41b. The bottom wall 41a is formed in a substantially circular shape when viewed from the axial direction of the worm wheel 45. In addition, the side wall 41b is provided to surround the periphery of the bottom wall 41a, and is erected from the bottom wall 41a in the axial direction of the worm wheel 45.

Furthermore, a boss part 41c formed in a substantially cylindrical shape is integrally provided at the substantially central portion of the bottom wall 41a of the gear case 41, and the boss part 41c is also erected from the bottom wall 41a in the axial direction of the worm wheel 45, similarly to the side wall 41b. In addition, a thin cylindrical part 41d is integrally provided on the side (upper side in the figure) of the boss part 41c opposite to the side of the bottom wall 41a to be coaxial with the boss part 41c.

Then, the axial base end side (lower side in the figure) of the support shaft 50 that rotatably supports the worm wheel 45 is embedded inside the boss part 41c and the thin cylindrical part 41d.

Here, the support shaft 50 is made of steel, and the support shaft 50 is embedded inside the boss part 41c and the thin cylindrical part 41d when the gear case 41 is molded by injecting a resin material such as molten plastic into the mold. In other words, the steel support shaft 50 is fixed to the resin gear case 41 by insert molding. The procedure for insert molding the gear case 41 will be described in detail later.

The small-diameter part 52 of the support shaft 50 and the thin cylindrical part 41d of the gear case 41 respectively rotatably support the worm wheel 45 without rattling. Here, the worm wheel 45 is formed of a resin material such as plastic, and the small-diameter part 52 is arranged on the radial inner side of the serration part 46.

Therefore, most of the reaction force is received by the small-diameter part 52 from the window regulator that tends to move the worm wheel 45 in the radial direction. As a result, the worm wheel 45 is rotatably supported mainly by the steel small-diameter part 52, so that the resin thin cylindrical part 41d is not worn early. Thus, the worm wheel 45 can rotate smoothly for a long period of time.

Three fixing legs 49 for fixing the motor 10 with the deceleration mechanism to a bracket (not shown) in the door are integrally provided outside the gear case 41 and on the outer side of the side wall 41b. These fixing legs 49 are arranged at substantially equal intervals (an interval of 120 degrees) along the circumferential direction of the worm wheel 45. As a result, when the motor 10 with the deceleration mechanism is operating, even if a large reaction force is applied to the worm wheel 45, twisting or rattling of the gear case 41 (motor 10 with the deceleration mechanism) can be effectively suppressed.

The fixing leg 49 is formed to be hollow, and a bush 49a made of a steel pipe is mounted inside the fixing leg 49. As a result, the motor 10 with the deceleration mechanism can be fixed to the bracket without rattling by tightening a fixing bolt (not shown) inserted through the fixing leg 49 with specified tightening torque, and the resin gear case 41 may not be damaged.

Here, it is important to keep the axial center C1 of the fixing leg 49 (bush 49a) and the axial center C2 of the support shaft 50 substantially parallel to each other accurately without variation for each product, and accurately maintain the separation distance (pitch) P between the axial center C1 and the axial center C2. If the axial center C1 and the axial center C2 are inclined to each other or the separation distance P varies, the fixed position of the motor 10 with the deceleration mechanism with respect to the window regulator, which is the object to be driven, may shift.

If the fixed position of the motor 10 with the deceleration mechanism with respect to the window regulator shifts, the driving force of the motor 10 with the deceleration mechanism may not be properly transmitted to the window regulator. Therefore, in the present embodiment, the shape of the support shaft 50 is devised so that the support shaft 50 can be accurately fixed to the gear case 41 by insert molding. The detailed structure of the support shaft 50 and the manufacturing procedure thereof will be described in detail later.

As shown in FIG. 1, the opening portion of the gear case 41 is sealed by a case cover 60. The case cover 60 is formed in a substantially disk shape by injection molding a resin material such as plastic, and the small-diameter output part 45b of the worm wheel 45 penetrates the central portion thereof via a seal member (not shown) such as a lip seal. As a result, rainwater, dust or the like is reliably prevented from entering the inside of the gear case 41.

As shown in FIG. 3 and FIG. 4, the support shaft 50 is formed to be stepped by cold forging a steel round bar having a circular cross section. Specifically, the support shaft 50 is provided with the large-diameter part 51 on the axial base end side and the small-diameter part 52 on the axial tip end side. Then, the axial dimension L1 of the large-diameter part 51 is shorter than the axial dimension L2 of the small-diameter part 52 (L1<L2). Further, the external diameter D1 of the large-diameter part 51 is larger than the external diameter D2 of the small-diameter part 52 (D1>D2). In addition, the dimensional tolerance ±α of the external diameter D2 of the small-diameter part 52 is smaller than the dimensional tolerance ±β of the external diameter D1 of the large-diameter part 51 (α<β).

That is, the small-diameter part 52 is formed to have higher accuracy and less variation than the large-diameter part 51. This is because when the support shaft 50 is formed by cold forging, the small-diameter part 52 is finished by drawing by a small-diameter part molding recess DC2c (see FIG. 6) of a second die DC2 formed with higher accuracy. In contrast, the large-diameter part 51 is not processed by drawing like the small-diameter part 52.

By molding the small-diameter part 52 with higher accuracy by drawing in this way, the dimensional accuracy of the external diameter thereof is improved, and the rotational resistance of the worm wheel 45 (see FIG. 2) against the small-diameter part 52 is suppressed from varying from product to product. In addition, the small-diameter part 52 can be held without rattling with respect to the lower mold MT (see FIG. 7) for molding the gear case 41 (see FIG. 2), and the axial center C1 and the axial center C2 (see FIG. 2 and FIG. 7) are effectively suppressed from being inclined to each other and the separation distance P (see FIG. 2 and FIG. 7) is effectively suppressed from varying.

As shown in FIG. 3 and FIG. 4, a step part 53 is provided between the large-diameter part 51 and the small-diameter part 52 of the support shaft 50. The outer peripheral surface of the step part 53 is an inclined surface that smoothly connects the large-diameter part 51 and the small-diameter part 52. In other words, the cross-sectional area of the step part 53 along the radial direction gradually decreases from the large-diameter part 51 to the small-diameter part 52. By connecting the large-diameter part 51 and the small-diameter part 52 smoothly with the step part 53 made of an inclined surface, stress is suppressed from concentrating on the portion of the support shaft 50 where the step part 53 is provided. As a result, sufficient rigidity of the support shaft 50 is ensured.

Further, an annular flange part (collar part) 54 is integrally provided on the axial base end side (lower side in FIG. 3) with respect to the large-diameter part 51 of the support shaft 50. The flange part 54 protrudes to the radial outer side of the large-diameter part 51 (support shaft 50) by a predetermined height h, and extends in the circumferential direction of the large-diameter part 51 (support shaft 50). That is, the external diameter D3 of the flange part 54 is larger than the external diameter D1 of the large-diameter part 51 (D3>D1, D3=D1+2×h).

Then, as shown in FIG. 2, the large-diameter part 51, the step part 53, and the flange part 54 are all embedded in the boss part 41c and the thin cylindrical part 41d of the gear case 41. Specifically, most of the small-diameter part 52 is exposed outside the gear case 41, but the large-diameter part 51, the step part 53, and the flange part 54 are embedded in the gear case 41 and are not exposed to the outside.

By respectively embedding the step part 53 and the flange part 54 in the gear case 41 in this way, sufficient resistance of the support shaft 50 against being pulled out from the gear case 41 is secured. Here, it is possible to secure a certain degree of the pulling resistance simply by embedding the support shaft 50 in the gear case 41 without providing the step part 53 or the flange part 54.

However, to secure the same pulling resistance as that of the present embodiment, it is necessary to increase the number of portions where the support shaft 50 and the gear case 41 are in contact with each other. Specifically, it is necessary to lengthen the axial dimensions of the support shaft 50, the boss part 41c, and the thin cylindrical part 41d, respectively. In this case, since the support shaft 50 is made of steel, the weight of the motor 10 with the deceleration mechanism increases, and the size of the motor 10 with the deceleration mechanism increases.

Therefore, in the present embodiment, the flange part 54 is provided in addition to the step part 53 and these are embedded in the gear case 41 to improve the resistance of the support shaft 50 from being pulled out from the gear case 41. As a result, the axial dimension of the support shaft 50 is reduced. Therefore, it is possible to adopt a relatively short support shaft 50, and make the motor 10 with the deceleration mechanism thinner and lighter.

In addition, as shown in FIG. 3, the axial dimension L2 of the small-diameter part 52 is approximately twice the axial dimension L1 of the large-diameter part 51, and the step part 53 is arranged at a portion near the flange part 54 (L2≈2× L1). As a result, the axial dimension of the thin cylindrical part 41d (see FIG. 2) is reduced, the amount of resin material (plastic material, etc.) required to form the gear case 41 is minimized, and the gear case 41 is made lighter and the manufacturing cost is reduced.

Furthermore, an anti-rotation part 55 formed in a serration shape (sawtooth shape) is integrally provided on the axial base end side (lower side in FIG. 3) with respect to the large-diameter part 51 of the support shaft 50, and further on the axial base end side with respect to the flange part 54. The external diameter of the anti-rotation part 55 is the same as the external diameter D1 of the large-diameter part 51, and the axial dimension L3 thereof is approximately half of the axial dimension L1 of the large-diameter part 51 (L3≈L1/2).

The anti-rotation part 55 prevents the support shaft 50 from slipping with respect to the gear case 41, and includes a plurality of grooves 55a extending in the axial direction of the support shaft 50. These grooves 55a are recessed to the radial inner side of the support shaft 50 by a predetermined depth, and are arranged at predetermined intervals in the circumferential direction of the support shaft 50.

Then, the anti-rotation part 55 is also embedded in the gear case 41 in the same manner as the large-diameter part 51, the step part 53, and the flange part 54 (see FIG. 2). The plurality of grooves 55a are filled with the resin material such as plastic that forms the gear case 41 in a state where the anti-rotation part 55 is embedded in the gear case 41. As a result, slipping of the support shaft 50 with respect to the gear case 41 is prevented. Therefore, the strength with which the support shaft 50 is fixed to the gear case 41 in the circumferential direction is also sufficiently secured.

Furthermore, as shown in FIG. 3 and FIG. 4, two axial ends of the support shaft 50 are provided with a first recess 56 and a second recess 57 that are recessed in the axial direction of the support shaft 50. The first recess 56 is provided in the small-diameter part 52, and the second recess 57 is provided in the anti-rotation part 55. Then, the first recess 56 and the second recess 57 both have a columnar shape, and the diameter dimension thereof is W1. In contrast, the depth dimension d1 of the first recess 56 is deeper than the depth dimension d2 of the second recess 57 (d1>d2).

By making two axial ends of the support shaft 50 hollow in this way, the weight of the support shaft in which all the portions are solid can be reduced. In addition, as will be described in detail later, the first recess 56 and the second recess 57 are formed by respectively pressing a second lower punch PU4 and a second upper punch PU3 (see FIG. 6) into two axial ends of a columnar work WK which is to be the support shaft 50. Therefore, the surface of the small-diameter part 52 near the first recess 56 and the surfaces of the flange part 54 and the anti-rotation part 55 near the second recess 57 can all be molded accurately.

Next, the manufacturing method of the motor 10 with the deceleration mechanism formed as described above, particularly the manufacturing procedure of the support shaft 50 and the insert molding procedure of the gear case 41, will be described in detail with reference to the figures.

As shown in FIG. 5, the support shaft 50 is formed through approximately four manufacturing processes.

[Round Bar Cutting Process]

First, the steel columnar work (round bar) WK which is to be the support shaft 50 is cut into a predetermined axial dimension (length dimension) L4 using a cutting tool such as a band saw. Here, the axial dimension L4 of the columnar work WK is determined in anticipation that the axial dimension of the support shaft 50 completed after processing becomes L6 (L4<L6).

The external diameter of the columnar work WK before processing is D4. This external diameter D4 is smaller than the external diameter D1 of the large-diameter part 51 of the support shaft 50 and larger than the external diameter D2 of the small-diameter part 52 of the support shaft 50 (D2<D4<D1). Here, the external diameter D4 of the columnar work WK is not yet processed, so the accuracy is low and the variation is large.

[First Recess Molding Process (1)]

Next, the columnar work WK prepared through the [round bar cutting process] is set in a hollow portion (not shown) of a tubular reference die. The internal diameter dimension of the hollow portion of the reference die is slightly larger than the external diameter D4 of the columnar work WK. Therefore, it is possible to easily set the columnar work WK in the hollow portion of the reference die.

Thereafter, the reference upper punch and the reference lower punch (neither shown) provided on two sides of the reference die in the longitudinal direction are moved to be close to each other, and the tip portions of the two punches are inserted into the hollow portion. As a result, the first preliminary cold forging is performed, and as shown in FIG. 5, the columnar work WK just cut becomes the first processed work (round bar) WK1.

Here, a columnar first preliminary recess HL1 which is to be the first recess 56 (see FIG. 3) later is formed on the axial tip end side (lower side in the figure) of the first processed work WK1. The diameter dimension W2 of the first preliminary recess HL1 is slightly larger than the diameter dimension W1 of the first recess 56 after completion (W2>W1).

Further, the depth dimension d3 of the first preliminary recess HL1 is approximately ¼ of the depth dimension d1 of the first recess 56 after completion (d3≈d1/4). At this time, the axial dimension L4 of the first processed work WK1 is substantially unchanged from the axial dimension L4 of the columnar work WK. The external diameter D5 of the first processed work WK1 is slightly larger than the external diameter D4 of the columnar work WK before processing (D5>D4) by the plastic flow of the portion of the first preliminary recess HL1.

[First Recess Molding Process (2)]

Next, the first processed work WK1 formed through the [first recess molding process (1)] is set in the tubular first die DC1 provided with the hollow portion H1 (see FIG. 6). The internal diameter dimension B1 of the hollow portion H1 is slightly larger than the external diameter D5 of the first processed work WK1 (B1>D5). Therefore, the first processed work WK1 can be easily set in the hollow portion H1 of the first die DC1.

Afterwards, the first upper punch PU1 and the first lower punch PU2 provided on two sides of the first die DC1 in the longitudinal direction are moved to be close to each other, as shown by the arrows M1 and M2 in FIG. 6, and the tip portions of the two punches PU1 and PU2 are inserted into the hollow portion H1. As a result, a second preliminary cold forging is performed, and as shown in FIG. 5 and FIG. 6, the first processed work WK1 becomes the second processed work (round bar) WK2.

Here, a columnar second preliminary recess HL2 which is to be the first recess 56 later is formed by the convex portion T1 of the first lower punch PU2 on the axial tip end side (lower side in the figure) of the second processed work WK2. The diameter dimension W3 of the second preliminary recess HL2 is slightly smaller than the diameter dimension W2 of the first preliminary recess HL1 and slightly larger than the diameter dimension W1 of the first recess 56 after completion (W2>W3>W1).

Further, the depth dimension d4 of the second preliminary recess HL2 is substantially the same as the depth dimension d1 of the first recess 56 after completion (d4=d1). At this time, the axial dimension L5 of the second processed work WK2 is larger than the axial dimension L4 of the first processed work WK1 and the columnar work WK (L5>L4). Furthermore, the external diameter D6 of the second processed work WK2 is slightly larger than the external diameter D5 of the first processed work WK1 (D6>D5). This is because the depth dimension d4 of the second preliminary recess HL2 is larger (deeper) than the depth dimension d3 of the first preliminary recess HL1 (d4>d3).

In the [first recess molding process (1)] and the [first recess molding process (2)] up to this point, particularly, the finishing process, that is, the drawing process, which improves the molding accuracy of the outer peripheral surfaces of the first processed work WK1 and the second processed work WK2 is not performed.

[Small-Diameter Part Molding Process]

Next, the final process (drawing process) of finishing the second processed work WK2 into the support shaft 50 is performed. Specifically, the second processed work WK2 formed through the [first recess molding process (2)] is set in the tubular second die (die) DC2 provided with the hollow portions H2, H3, and H4. The second die DC2 is a drawing mold that finally finishes the support shaft 50 and improves the accuracy of the small-diameter part 52.

The portion of the hollow portion H2 in the second die DC2 is the base end part molding recess DC2a for molding the flange part 54 and the anti-rotation part 55 at the base end part of the support shaft 50. Further, the portion of the hollow portion H3 in the second die DC2 is the large-diameter part molding recess DC2b for molding the large-diameter part 51 of the support shaft 50. In addition, the portion of the hollow portion H4 in the second die DC2 is the small-diameter part molding recess DC2c for molding the small-diameter part 52 of the support shaft 50. Further, the portion between the large-diameter part molding recess DC2b and the small-diameter part molding recess DC2c of the second die DC2 is the step part molding recess DC2d for molding the step part 53 of the support shaft 50.

The step part molding recess DC2d is formed by an inclined surface inclined so as to gradually reduce the internal diameter dimension from the large-diameter part molding recess DC2b toward the small-diameter part molding recess DC2c. As a result, the axial tip portion of the second processed work WK2 can be easily led (guided) from the large-diameter part molding recess DC2b to the small-diameter part molding recess DC2c.

Then, the internal diameter dimension B2 of the hollow portion H2 and the internal diameter dimension B3 of the hollow portion H3 are larger than the external diameter D6 of the second processed work WK2, respectively (D6<B3<B2). In contrast, the internal diameter dimension B4 of the hollow portion H4 is smaller than the external diameter D6 of the second processed work WK2 (B4<D6). As a result, the axial tip portion of the second processed work WK2 can be easily set to the place of the large-diameter part molding recess DC2b of the second die DC2.

Thereafter, the second upper punch (punch) PU3 and the second lower punch (punch) PU4 provided on two sides of the second die DC2 in the longitudinal direction are moved to be close to each other, as shown by the arrows M3 and M4 in FIG. 6, and the tip portions of the two punches PU3 and PU4 are inserted into the hollow portion H2 and the hollow portion H4, respectively. As a result, the final finishing cold forging is performed, and as shown in FIG. 5 and FIG. 6, the second processed work WK2 becomes the support shaft 50 (finished product).

More specifically, the axial tip end side of the second processed work WK2 is pressed by the second upper punch PU3 and descends, and is pushed into the small-diameter part molding recess DC2c along with plastic deformation. That is, the axial tip end side of the second processed work WK2 is forcibly drawn by the small-diameter part molding recess DC2c, and the external diameter D2 thereof (external diameter of the small-diameter part 52) is accurately formed with the dimensional tolerance ±α. In contrast, the portion of the large-diameter part 51 is not a portion that is forcibly drawn, and therefore has a large variation as compared with the small-diameter part 52 (dimensional tolerance ±β).

As described above, the portion of the small-diameter part 52 is formed by drawing that it is forcibly drawn by the small-diameter part molding recess DC2c. Therefore, the dimensional accuracy of the external diameter of the small-diameter part 52 is improved as compared with the large-diameter part 51 that has not been drawn.

The axial tip end side (lower side in the figure) of the support shaft 50 is finished by the convex portion T2 of the second lower punch PU4, and finally becomes the first recess 56. Further, the axial base end side (upper side in the figure) of the support shaft 50 is finished by the recess S1 of the second upper punch PU3, and the flange part 54, the anti-rotation part 55, and the second recess 57 are finally formed in the portion of the base end part molding recess DC2a.

Furthermore, the axial dimension L6 of the support shaft 50 is larger than the axial dimension L5 of the second processed work WK2 (L6>L5). Further, the external diameter D1 of the large-diameter part 51 of the support shaft 50 is slightly larger than the external diameter D6 of the second processed work WK2 (D1>D6). Further, the step part 53 is formed between the large-diameter part 51 and the small-diameter part 52 by the step part molding recess DC2d.

Next, the procedure for integrally providing the support shaft 50 processed as described above in the gear case 41 by insert molding will be described in detail with reference to the figures.

The gear case 41 is formed by insert molding by an injection molding device ID shown in FIG. 7.

Specifically, the injection molding device ID includes the lower mold MT for molding the inner side of the gear case 41. The injection molding device ID includes an upper mold (not shown) provided with a dispenser (supply mechanism) for supplying molten resin in addition to the lower mold MT, and the upper mold is movable up and down with respect to the lower mold MT.

Referring to FIG. 2, the lower mold MT is provided with a first molding part MT1 for forming the bottom wall 41a, a second molding part MT2 for forming the side wall 41b, a third molding part MT3 for forming the boss part 41c, a fourth molding part MT4 for forming the thin cylindrical part 41d, and a fifth molding part MT5 for forming the fixing legs 49.

In addition to these, the lower mold MT is provided with a positioning recess MT6 into which the small-diameter part 52 of the support shaft 50 is inserted to position the support shaft 50 with respect to the lower mold MT. Further, the lower mold MT is provided with a bush holding protrusion MT7 for holding the bush 49a mounted on the gear case 41 by insert molding together with the support shaft 50.

Then, as shown by the arrows M5 and M6 in the figure, the small-diameter part 52 is inserted into the positioning recess MT6, and the bush 49a is mounted on the bush holding protrusion MT7. Thereafter, the upper mold is lowered to match the lower mold MT. As a result, a cavity (not shown) for molding the gear case 41 is formed between the two. Next, molten resin is pumped into the cavity at a predetermined pressure to be spread throughout the cavity.

Thereafter, the molten resin in the cavity is cured by cooling the upper mold and the lower mold MT, and then the upper mold is raised with respect to the lower mold MT, and the gear case 41 in which the support shaft 50 and the bush 49a are integrated (insert-molded) is released from the upper mold and the lower mold MT. As a result, the gear case 41 as shown in FIG. 2 is completed.

Here, the small-diameter part 52 is accurately positioned without rattling in the positioning recess MT6 of the lower mold MT. Further, the bush 49a is accurately positioned without rattling on the bush holding protrusion MT7 of the lower mold MT. Therefore, the axial center C1 of the bush 49a (fixing leg 49) and the axial center C2 of the support shaft 50 can be kept parallel to each other accurately without variation for each product, and the separation distance P between the axial center C1 and the axial center C2 can be accurately maintained.

As described in detail above, according to the motor 10 with the deceleration mechanism according to the present embodiment, the small-diameter part 52 having a smaller diameter than the large-diameter part 51 is provided by drawing, the large-diameter part 51 and the step part 53 are embedded in the gear case 41, and the small-diameter part 52 is exposed outside the gear case 41. As a result, the dimensional accuracy (dimensional tolerance ±α) of the external diameter D2 of the small-diameter part 52 is improved, and the small-diameter part 52 can be set in the lower mold MT for molding the gear case 41 without rattling, and consequently, it is possible to provide the support shaft 50 to the gear case 41 accurately without variation.

Further, since the large-diameter part 51 and the step part 53 are embedded in the gear case 41, the resistance of the support shaft 50 against being pulled out from the gear case 41 can be improved.

Therefore, it is possible to suppress the performance of the motor 10 with the deceleration mechanism from varying from product to product, and to stably drive the object to be driven, such as a window regulator. Therefore, the yield can be improved.

In addition, according to the motor 10 with the deceleration mechanism according to the present embodiment, the flange part 54, which protrudes to the radial outer side of the support shaft 50, extends in the circumferential direction of the support shaft 50, and is embedded in the gear case 41, is provided on the axial base end side with respect to the large-diameter part 51 of the support shaft 50.

Therefore, it is possible to secure sufficient resistance of the support shaft 50 against being pulled out from the gear case 41, and consequently the axial dimension of the support shaft 50 can be reduced. Therefore, it is possible to adopt a relatively short support shaft 50, and make the motor 10 with the deceleration mechanism thinner and lighter.

Further, according to the motor 10 with the deceleration mechanism according to the present embodiment, the groove 55*a*, which is recessed to the radial inner side of the support shaft 50, extends in the axial direction of the support shaft 50, and is embedded in the gear case 41, is provided on the axial base end side with respect to the large-diameter part 51 of the support shaft 50.

Therefore, slipping of the support shaft 50 with respect to the gear case 41 can be reliably prevented. Therefore, the strength with which the support shaft 50 is fixed to the gear case 41 in the circumferential direction can also be sufficiently secured.

Further, according to the motor 10 with the deceleration mechanism according to the present embodiment, the axial dimension L1 of the large-diameter part 51 is shorter than the axial dimension L2 of the small-diameter part 52 (L1<L2).

Therefore, the axial dimension of the thin cylindrical part 41*d* (see FIG. 2) can be reduced, and consequently the amount of resin material required to form the gear case 41 can be minimized, and the gear case 41 can be made lighter and the manufacturing cost can be reduced.

Further, according to the manufacturing method of the motor 10 with the deceleration mechanism according to the present embodiment, the small-diameter part 52 is formed through the drawing process, which presses the steel second processed work WK2 set in the second die DC2 from the axial direction to push the axial tip end side of the second processed work WK2 into the small-diameter part molding recess DC2*c* provided in the second die DC2 and make the external diameter smaller than that of the large-diameter part 51.

Therefore, by the drawing process that draws forcibly (cold forging), the support shaft 50 can be formed easily, with high accuracy, and in a short period of time. Therefore, it is possible to improve the yield and improve the mass productivity.

It goes without saying that the invention is not limited to the above-described embodiment, and various modifications can be made without departing from the gist thereof. For example, the above-described embodiment illustrates that the motor 10 with the deceleration mechanism is applied to a drive source of a power window device mounted on a vehicle, but the invention is not limited thereto. The motor 10 with the deceleration mechanism can also be applied to other drive sources such as sunroof devices.

Further, the above-described embodiment illustrates that an electric motor with a brush is used in the motor part 20, but the invention is not limited thereto. For example, a brushless electric motor or the like can also be used in the motor part 20.

In addition, the material, shape, size, number, installation location, etc. of each component in the above-described embodiment are arbitrary as long as the invention can be achieved, and are not limited to the above-described embodiment.

What is claimed is:

1. A motor device for decelerating and outputting rotation of an armature shaft, comprising:
    a worm rotated by the armature shaft;
    a worm wheel having teeth meshed with the worm;
    a case made of resin and accommodating the worm and the worm wheel;
    a support shaft made of steel and rotatably supporting the worm wheel;
    a first diameter part provided on an axial base end side of the support shaft;
    a second diameter part provided on an axial tip end side of the support shaft and having a smaller diameter than the first diameter part, wherein the second diameter part is formed by a drawing process; and
    a step part provided between the first diameter part and the second diameter part of the support shaft,
    wherein the first diameter part and the step part are embedded in the case, and the second diameter part is exposed outside the case.

2. The motor device according to claim 1, wherein an axial dimension of the first diameter part is shorter than an axial dimension of the second diameter part.

3. The motor device according to claim 1, wherein a collar part, which protrudes to a radial outer side of the support shaft, extends in a circumferential direction of the support shaft, and is embedded in the case, is provided on the axial base end side with respect to the first diameter part of the support shaft.

4. The motor device according to claim 3, wherein a groove, which is recessed to a radial inner side of the support shaft, extends in an axial direction of the support shaft, and is embedded in the case, is provided on the axial base end side with respect to the first diameter part of the support shaft.

5. The motor device according to claim 3, wherein an axial dimension of the first diameter part is shorter than an axial dimension of the second diameter part.

6. The motor device according to claim 1, wherein a groove, which is recessed to a radial inner side of the support shaft, extends in an axial direction of the support shaft, and is embedded in the case, is provided on the axial base end side with respect to the first diameter part of the support shaft.

7. The motor device according to claim 6, wherein an axial dimension of the first diameter part is shorter than an axial dimension of the second diameter part.

8. A manufacturing method of a motor device for decelerating and outputting rotation of an armature shaft, wherein the motor device comprises:
    a worm rotated by the armature shaft;
    a worm wheel having teeth meshed with the worm;
    a case made of resin and accommodating the worm and the worm wheel;
    a support shaft made of steel and rotatably supporting the worm wheel;
    a first diameter part provided on an axial base end side of the support shaft;
    a second diameter part provided on an axial tip end side of the support shaft and having a smaller diameter than the first diameter part; and
    a step part provided between the first diameter part and the second diameter part of the support shaft,
    wherein the first diameter part and the step part are embedded in the case, and the second diameter part is exposed outside the case, and the second diameter part is formed through a drawing process which presses a round bar made of steel and set in a die from an axial direction to push an axial tip end side of the round bar into a second diameter part molding recess provided in the die and make an external diameter of the second diameter part smaller than an external diameter of the first diameter part.

* * * * *